United States Patent
Hsieh et al.

(10) Patent No.: US 6,205,251 B1
(45) Date of Patent: *Mar. 20, 2001

(54) DEVICE AND METHOD FOR DECOMPRESSING COMPRESSED VIDEO IMAGE

(75) Inventors: Tsung-Hsien Hsieh, Kaoshiung Hsien; Rong-Fu Hsu, Hsinchu, both of (TW)

(73) Assignee: Winbond Electronics Corp., Hsinchu City (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 38 days.

(21) Appl. No.: 09/000,861

(22) Filed: Dec. 30, 1997

(30) Foreign Application Priority Data

Nov. 6, 1997 (TW) ................................. 86116555

(51) Int. Cl.[7] ................. G06K 9/36; G06K 9/46
(52) U.S. Cl. ................. 382/233; 382/246; 382/298
(58) Field of Search ................. 382/246, 233, 382/298; 358/427, 261.1; 348/395

(56) References Cited

U.S. PATENT DOCUMENTS 4,791,680 * 12/1988 Yokoe et al. .................. 382/298
5,834,749 * 11/1998 Durbin ............................ 235/454

\* cited by examiner

*Primary Examiner*—Bhavesh Mehta
(74) *Attorney, Agent, or Firm*—Daniel M. Cislo, Esq.; Cislo & Thomas, LLP

(57) ABSTRACT

A method and device for decompressing a compressed video image and capable of enlarging or contracting the image at the same time. The method utilizes an enhancement/contraction pre-processor to perform enlargement or contraction processing on the compressed data in the vertical direction. Then, at a later stage, an enhancement/contraction post-processor is used to perform enlargement or contraction processing on the decompressed data in the horizontal direction. By dividing the whole video image into a number of rows and dealing with each row sequentially, memory for storing a single row of video data is only required. Therefore, a whole image can be decompressed without using large amount of memory for storing the decompressed data; a large amount of memory is saved.

10 Claims, 2 Drawing Sheets

| d0 d1 | d2 d3 |
|---|---|
| NUMBER OF PIXELS DATA | PIXEL COLOR DATA |

FIG. 1 (PRIOR ART)

| d0 | d1 | d2 d3 d4 d5 | d6 d7 |
|---|---|---|---|
| 0 | 0 | NUMBER OF PIXELS DATA | PIXEL COLOR DATA |

FIG. 2 (PRIOR ART)

| d0 | d1 | d2 | d3 | d4 d5 d6 d7 d8 d9 | d10 d11 |
|---|---|---|---|---|---|
| 0 | 0 | 0 | 0 | NUMBER OF PIXELS DATA | PIXEL COLOR DATA |

FIG. 3 (PRIOR ART)

| d0 | d1 | d2 | d3 | d4 | d5 | d6 d7 d8 d9 d10 d11 d12 d13 | d14 d15 |
|---|---|---|---|---|---|---|---|
| 0 | 0 | 0 | 0 | 0 | 0 | NUMBER OF PIXELS DATA | PIXEL COLOR DATA |

FIG. 4 (PRIOR ART)

| d0 | d1 | d2 | d3 | d4 | d5 | d6 | d7 | d8 | d9 | d10 | d11 | d12 | d13 | d14 d15 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | PIXEL COLOR DATA |

FIG. 5 (PRIOR ART)

DEVICE AND METHOD FOR DECOMPRESSING COMPRESSED VIDEO IMAGE

CROSS-REFERENCE TO RELATED APPLICATION

This application claims the priority benefit of Taiwan application Ser. No. 86116555, filed Nov. 6, 1997, the full disclosure of which is incorporated herein by reference.

BACKGROUND OF THE INVENTION

1. Field of Invention

The present invention relates to a device and method for processing video image. More particularly, the present invention relates to the device and method for decompressing the compressed video data of a video image in a system that uses a variable-length encoding method with a line-end-code.

2. Description of Related Art

Following the recent advance in computer technologies, computer systems have become part of our life. Through linking to the Internet, the newest information from the world can be obtained in your personal computer. In recent years, the quantity of information flowing through a computer network has increased tremendously. Beside the general alphanumeric data, other types of data such as voice and video image are transmitted in vast quantities. The favored gem of today's PC hobbyist and general users is the multimedia system. A multimedia system need to shuttle vast amount of voice and video data around, hence, whether to store or to transmit, these data must be compressed in order to save memory space and increase processing time. For a multimedia system, the system must also include some other functions such as the enlargement and contraction of images besides having the basic function of decompressing the compressed video data.

There are a number of methods for decompressing the compressed video data. For example, one conventional method is to target the decompression of one horizontal line at a time. In practice, the first line of compressed video data is decompressed first, before the decompression of the second line is executed, and so on processing sequentially from the top line down to the bottom line. The conventional formats for storing row compressed video data are shown in FIGS. 1 through 4. They are composed of two parts, namely, a first part for storing the number of pixels and a second part for storing the color of the pixels. The length for storing the number of pixels is variable, for example, ranging from occupying 2-bits up to 14-bits as shown in FIGS. 1 through 4. On the other hand, the length for storing the color of the pixels is fixed, normally occupies just two bits. Therefore, when information from these two parts is obtained the number of pixels and its color in the horizontal direction is completely specified. By receiving and then decompressing the row compressed video data piece by piece in a left to right manner before reaching the line-end-code, the complete pixel image in a horizontal line is thus obtained. The line-end-code is very similar in format to the row compressed video data as shown in FIG. 5, except that the first part is of fixed length and all consists of zeros; while the second part stores the color of the pixels. When the receiver picks up the line-end-code, it will interpret to mean that the horizontal pixels from that point on are of the same color as specified in the color part of the line-end-code. The receiving of a line-end-code implies the end of a line, and therefore, anything received thereafter represent the code for the next line down. Again, decompression starts from the left side in a sequential order until the line-end-code is again received. The whole process is repeated many times from top to bottom line by line to form a decompressed data into a video image.

To enlarge or contract video images, the conventional method is to receive the whole packet of compressed video data, decompress it before applying the enlargement or contraction to create the actual image. As mentioned before, a large storage area is required to store up the decompressed video data; hence, a large capacity storage buffer is needed. This represents a waste in the memory storage space. At present, although the memory capacity of a dynamic random access memory (DRAM) chip is large and unit cost of it is rather cheap, DRAM chips are by no means cheap. Moreover, time is also wasted in writing a large quantity of data to a DRAM chip and then reading it from the DRAM chip for processing. In other words, the conventional method of processing image data is uneconomical.

In light of the foregoing, there is a need to provide devices and improved method for decompressing video image data.

SUMMARY OF THE INVENTION

Accordingly, the present invention is to provide a device and method for decompressing video image data. Through going through a pre-processing operation of the compressed data before entering the decompression stage, memory space are saved and processing time is decreased.

To achieve these and other advantages and in accordance with the purpose of the invention, as embodied and broadly described herein, the invention provides a device and method for decompression video image data such that the compressed data related to the vertical direction is processed first. In other words, before the compressed video data is decompressed, the compressed data of the image is processed for the enlargement or contraction in the vertical direction first. In an image contraction process, that portion of the row compressed data where no processing is required is discarded before data decompression. Hence, there is no need to perform decompression again, and so processing time can be saved. Furthermore, the decompressing method used in this invention is processing only a row of video image at a time. Therefore, only a buffer large enough to hold a line of data is required, and much memory space is saved.

In this invention, decompression and the enlargement or contraction of video image data is performed together. First, an enlargement/contraction pre-processor receives the compressed image data. Next, the compressed image data is searched to find the line-end-code, and then a row compressed image data is sent to a compressed data buffer. According to the line-end-code, the row number of a line can be found. Then, according to an enlargement/contraction ratio, whether the line received in the compressed data buffer need to be further processed and in what ways is determined. If the image needs to be enlarged, then the row compressed data in the compressed data buffer can be duplicated and then sent out. Alternatively, if the image needs to be contracted, then the row compressed data in the compressed data buffer can be discarded or be sent out directly. If an enlargement/contraction ratio same as the original is wanted, then the row compressed data in the compressed data buffer can be directly sent out without any enlargement/contraction processing. Thereafter, the row compressed data in the compressed data buffer is transferred to a variable length decoder to decompress the row compressed data and obtain row image data. Subsequently, the row image data is sent to a decompressed data buffer. When the decompressed data buffer has received a whole line of row image data, the whole line of row image data will be sent to an enlargement/contraction post-processor. The enlargement/contraction post-processor performs the necessary horizontal enlargement or contraction according to the enlargement/contraction ratio. Its principle of operation is very similar to the operation of the aforementioned enlargement/contraction pre-processor. If an image needs to be enlarged, the post-processor will display some pixels repeatedly according to the enlargement ratio. On the other hand, if an image needs to be contracted, then a few pixels will be discarded according to the contraction ratio. Hence, the required horizontal enlargement or contraction of an image is achieved. Since vertical enlargement or contraction processing is already achieved on reaching the compressed data buffer, compressed data of the whole image can be decompressed accompanied by the necessary enlargement/contraction by repeating the above operation.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 is diagram showing the conventional format for representing compressed data having 1 to 3 pixels, data is represented by 4 bits where the first two bits d0 and d1 represents the number of pixels ranging from 1 to 3, while the latter two bits d2 and d3 represent the pixel color, and when the number of pixels is between 1 to 3, the first two bits cannot be 0;

FIG. 2 is diagram showing the conventional format for representing compressed data having 4 to 15 pixels, data is represented by 8 bits where the first two bits d0 and d1 are 0, the next 4 bits d2 to d5 represent the number of pixels ranging from 4 to 15, while the last two bits d6 and d7 is used to represent the pixel color;

FIG. 3 is diagram showing the conventional format for representing compressed data having 16 to 63 pixels, data is represented by 12 bits where the first four bits d0 to d3 are 0, the next 6 bits d4 to d9 represent the number of pixels ranging from 16 to 63, while the last two bits d10 and d11 is used to represent the pixel color;

FIG. 4 is diagram showing the conventional format for representing compressed data having 64 to 255 pixels, data is represented by 16 bits where the first six bits d0 to d5 are 0, the next 8 bits d6 to d13 represent the number of pixels ranging from 64 to 255, while the last two bits d14 and d15 is used to represent the pixel color;

FIG. 5 is diagram showing the conventional format for representing line-end-code data, whenever the line-end-code is received, the remaining pixels will all be of the same color as specified by the last two color bits d14 and d15 till the end of the line;

DESCRIPTION OF THE PREFERRED EMBODIMENTS

Figure 6:
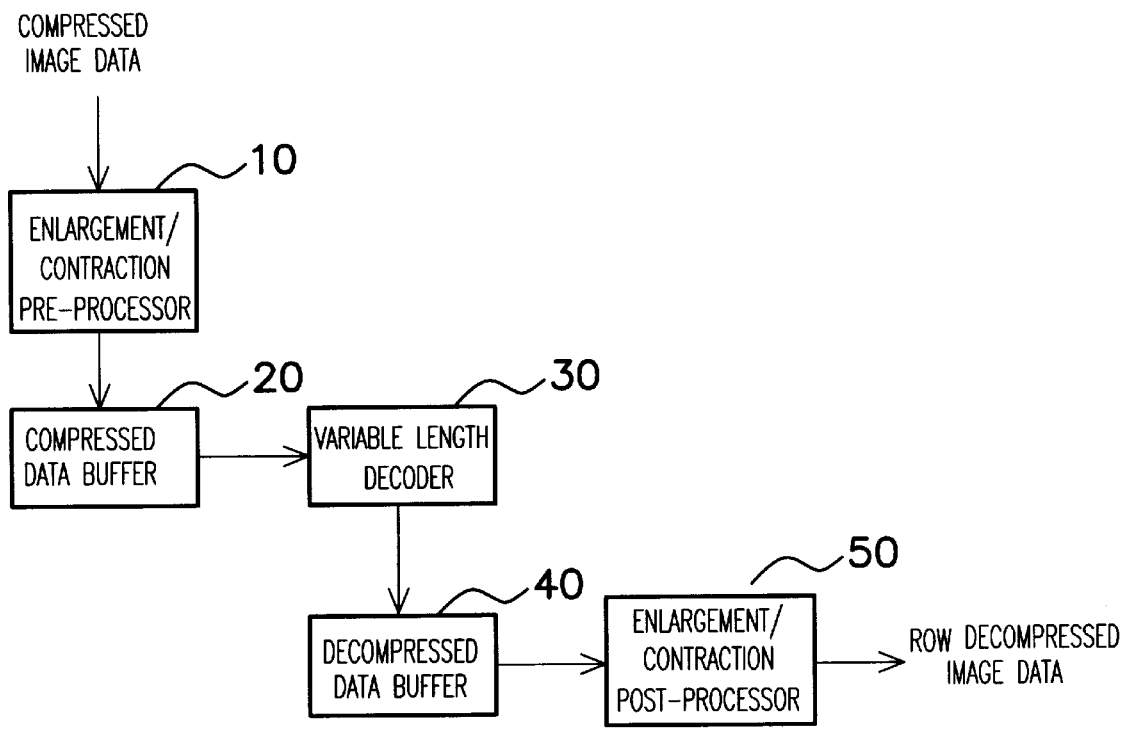
FIG. 6 is a block diagram showing a device and method for decompressing and enlarging/contracting compressed image data according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 6 is a block diagram showing a device and method for decompressing and enlarging/contracting compressed image data according to one preferred embodiment of this invention. First, an enlargement/contraction pre-processor 10 picks up compressed video data, then searching out the line-end-cod and sending out a row compressed data to a compressed data buffer 20. From the line-end-code, the row number of a particular line of compressed data is distinguished. Next, the row compressed data in the compressed data buffer 20 is determined whether further processing is necessary and what kind of actions to undertake by referring to an enlargement/contraction ratio. If the image needs to be enlarged, then the row compressed data in the compressed data buffer 20 can be duplicated and sent out. Alternatively, if the image needs to be contracted, then the row compressed data in the compressed data buffer 20 can be discarded. If an enlargement/contraction ratio same as the original is wanted, then the row compressed data in the compressed data buffer 20 can be directly sent out without any processing by the pre-processor. Beside sending out a row compressed data, the enlargement/contraction pre-processor 10 also send out a row control signal for controlling the transmission of the row compressed data inside the compressed data buffer 20. Detailed description of the devices and processing steps are shown in FIG. 7.

Next, a variable length decoder 30 receives a row compressed data from the compressed data buffer 20, and then the row compressed data is decompressed to form a row image data. The row image data is then sent out and is stored in a decompressed data buffer 40. When the decompressed data buffer 40 has received a whole line of row image data, the whole line of row image data is sent out to an enlargement/contraction post-processor 50. The function of the post-processor 50 is to take in the whole line of row image data and then enlarge or contract in a horizontal direction according to the enlargement/contraction ratio. Its principle of operation is very similar to the operation of the aforementioned enlargement/contraction pre-processor 10. If an image needs to be enlarged, the post-processor 50 will display some pixels repeatedly according to the enlargement ratio. On the other hand, if an image needs to be contracted, then the post-processor 50 will discard a few pixels according to the contraction ratio. Hence, the required horizontal enlargement or contraction of an image is achieved. Since vertical enlargement or contraction processing is already achieved on reaching the compressed data buffer 20, compressed data of the whole image can be decompressed accompanied by the necessary enlargement/contraction by repeating the above operation.

Figure 7:
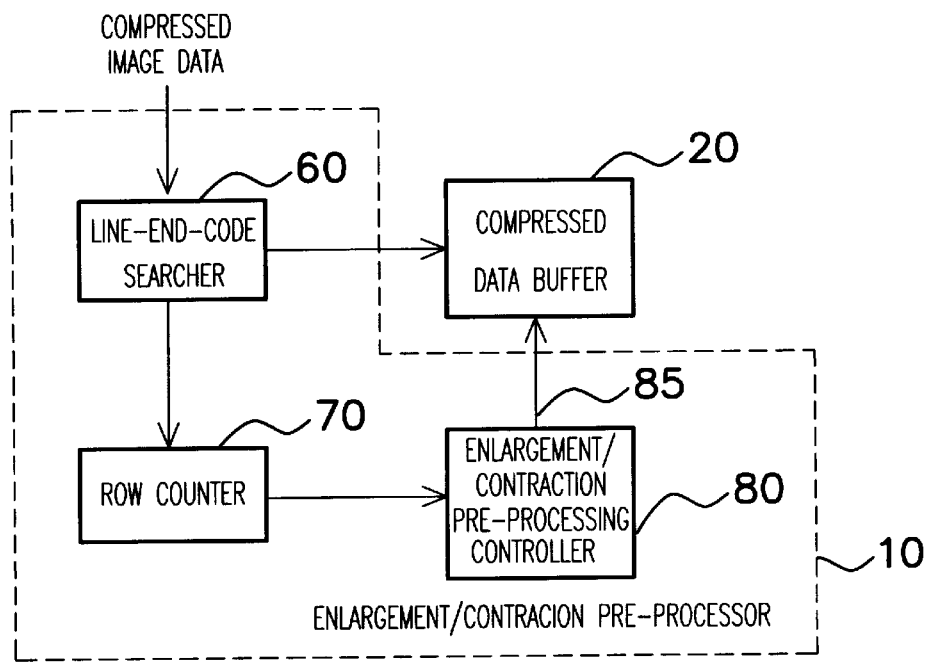
FIG. 7 is a block diagram showing the enlargement/contraction pre-processor 10 as shown in FIG. 6.

FIG. 7 is a block diagram showing the enlargement/contraction pre-processor 10 as shown in FIG. 6. First, the compressed image data is collected and then sent to the compressed data buffer 20 through a line-end-code searcher 60. Through the operation of the line-end-code searcher 60, the line-end-code is checked out and then a signal is sent to a row counter 70, which registers the row number of the received line of data. Then, the row number data is sent out from the row counter 70 to an enlargement/contraction pre-processing controller 80. Depending on the enlargement/contraction ratio received by the enlargement/contraction pre-processing controller 80, controlling signals 85 are sent to the compressed data buffer 20 for carrying out subsequent duplication, elimination or absent of action accordingly. Hence, the mode of transmission of the compressed data inside the compressed data buffer 20 is under control, thereby achieving the pre-processing of image enlargement/contraction data in a vertical direction.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A device for decompressing compressed image data that has a line-end-code and is capable of being enlarged or contracted according to a prescribed ratio, comprising:

an enlargement/contraction pre-processor for receiving compressed image data and sending out a row control signal and a row compressed data according to the line-end-code and the enlargement/contraction ratio;

a compressed data buffer coupled to the enlargement/contraction pre-processor for processing the incoming row compressed data following the instructions from the row control signal, and then sending out duplicated, eliminated or unchanged row compressed data thereafter;

a variable length decoder coupled to the compressed data buffer for receiving the row compressed data, decompressing the row compressed data to form a row image data and then sending out the row image data;

a decompressed data buffer coupled to the variable length decoder for temporary storage of the row image data; and an enlargement/contraction post-processor coupled to the decompressed data buffer for receiving a whole line of the row image data, and then sending out after the whole line of the row image data is enlarged or contracted accordingly to the enlargement/contraction ratio.

2. The device of claim 1, wherein the enlargement/contraction pre-processor further comprises:

a line-end-code searcher for checking out the line-end-code in the row compressed data, sending out the line-end-code and then sending out the row compressed data to the compressed data buffer;

a row counter coupled to the line-end-code searcher for receiving the line-end-code, and sending out row number data after computation; and an enlargement/contraction pre-processing controller coupled to the row counter for receiving the row number data, and then sending out the row control signal representing actions to duplicate, eliminate or do nothing according to the enlargement/contraction ratio.

3. The device of claim 2, wherein when the enlargement/contraction ratio is for enlargement, then the row compressed data will either be duplicated or remain unchanged and then sent out.

4. The device of claim 2, wherein when the enlargement/contraction ratio is for contraction, then the row compressed data will either be eliminated or remain unchanged and then sent out.

5. The device of claim 1, wherein the decompressed data buffer is fabricated using static random access memory.

6. The device of claim 1, wherein the decompressed data buffer need to store one row of image data only.

7. A method for decompressing compressed image data, comprising the steps of:

providing a compressed image data having a line-end-code in it;

sending out a row control signal and a row compressed data according to the line-end-code of the compressed image data and an enlargement/contraction ratio;

processing the row compressed data by either duplicating, eliminating or doing nothing according to the row control signal received;

decompressing the row compressed data to get a row image data;

enlarging or contracting a whole line of the row image data according to the enlargement/contraction ratio;

repeating the above steps until the compressed data for the whole image is decompressed and the process of enlarging or contracting is completed.

8. The method of claim 7, wherein the step of sending out a row control signal and a row compressed data according to the line-end-code of the compressed image data and an enlargement/contraction ratio further includes the substeps of:

checking out the line-end-code from the row compressed data and then sending out the row compressed data and the line-end-code;

sending out row number data after computing the line-end-code; and sending out control signals that represent actions either to duplicate, eliminate or do nothing according to a computation involving the row number data and the enlargement/contraction ratio.

9. The method of claim 8, wherein when the enlargement/contraction ratio is for enlargement, then the row compressed data will either be duplicated or remain unchanged and then sent out depending on the row control signal.

10. The method of claim 8, wherein when the enlargement/contraction ratio is for contraction, then the row compressed data will either be eliminated or remain unchanged and then sent out depending on the row control signal.

* * * * *